United States Patent [19]

Kauchi et al.

[11] Patent Number: 5,227,234
[45] Date of Patent: Jul. 13, 1993

[54] THERMAL ADHESIVE VIBRATION DAMPING SHEETS

[75] Inventors: Kakutaro Kauchi; Youhei Suzuki, both of Sodegaura; Yasumasa Fujii, Tokyo; Kenji Yokoyama, Tokyo; Yoshio Iida, Tokyo; Masahiko Ooyama, Tokyo, all of Japan

[73] Assignees: Mitsui Petrochemical Industries, Ltd.; NEC Environment Engineering, Ltd., both of Tokyo, Japan

[21] Appl. No.: 741,607

[22] Filed: Aug. 7, 1991

[30] Foreign Application Priority Data

Aug. 10, 1990 [JP] Japan ............................ 2-213426

[51] Int. Cl.⁵ .................. B32B 11/12; B32B 11/02; B32B 7/12
[52] U.S. Cl. .................................. 428/355; 428/489; 428/402; 428/343; 428/327; 427/207.1; 427/208.2
[58] Field of Search ............... 428/355, 327, 489, 402, 428/343; 427/207.1, 208.2

[56] References Cited

U.S. PATENT DOCUMENTS

| | | | |
|---|---|---|---|
| 3,531,316 | 9/1970 | Sternasty | 428/240 |
| 3,658,635 | 4/1972 | Eustice | 428/461 X |
| 4,174,335 | 11/1979 | Ohdaira et al. | 525/313 X |
| 4,204,022 | 5/1980 | Snyder et al. | 428/337 |
| 4,599,261 | 7/1986 | Hart et al. | 428/463 X |
| 4,740,427 | 4/1988 | Ochiumi et al. | 428/458 X |
| 4,942,219 | 7/1990 | Yatsuka et al. | 428/245 X |

FOREIGN PATENT DOCUMENTS

| | | |
|---|---|---|
| 56-115249 | 9/1981 | Japan . |
| 56-115665 | 9/1981 | Japan . |
| 58-42207 | 9/1983 | Japan . |
| 62-252476 | 11/1987 | Japan . |

OTHER PUBLICATIONS

Abst: 96:39898f: Asphalt-type Vibration Absorbing Sheet for Automobile Floors: (JP 81,115,249) Nihon Tokushu Toryo.

Primary Examiner—George F. Lesmes
Assistant Examiner—D. R. Zirker
Attorney, Agent, or Firm—Birch, Stewart, Kolasch & Birch

[57] ABSTRACT

A thermal adhesive vibration damping sheet comprising a sheet substrate having crystalline polyolefin particles attached to a surface thereof, said polyolefin particles having a mean particle size of 1 to 20 μm and exhibiting an endothermic curve having a high temperature side endothermic peak in the range of from 50° to 230° C. as measured by a differential scanning calorimeter. The sheet has improved blocking resistance, adhesion to sheet steel through heat fusion, and impact resistance at low temperatures.

5 Claims, 7 Drawing Sheets

THERMAL ADHESIVE VIBRATION DAMPING SHEETS

BACKGROUND OF THE INVENTION

1. Field of the Invention

This invention relates to thermal adhesive vibration damping sheets, and more particularly, to thermal adhesive vibration damping sheets which are resistant against blocking during storage in stacked form and well adhere to sheet steel by heat fusion.

2. Description of the Related Art

In the past, sheets were often laid on sheet steel and similar members for damping the vibration thereof. Most vibration damping sheets were formed of thermal adhesive material and prone to blocking with each other when they were stored in a stacked form, especially at high temperatures as encountered in summer, because of softening at such temperatures or bleeding of oil from the sheets. One prior art approach for preventing blocking was by dispersing non-adhesive powder such as talc to the surface of vibration damping sheets prior to stacking and shelf storage. This approach, however, had several problems including the scattering of talc or other non-adhesive powder which would aggravate the working environment, and deficient adhesion of vibration damping sheets to sheet steel. Moreover, the prior art vibration damping sheets had poor low-temperature impact resistance so that if sheet steel covered with a vibration damping sheet is impacted at low temperatures as encountered in winter, the vibration damping sheet could separate from the underlying sheet steel.

It was proposed to solve these problems by covering vibration damping sheets on their surface with film for preventing scattering of talc and other non-adhesive powder (Japanese Patent Application Laid Open Nos. 115249/1981 and 115665/1981) and by coating an emulsion to the surface of vibration damping sheets (Japanese Patent Application Laid Open No. 252476/1987). The former technique could preventing non-adhesive powder from scattering, but failed to overcome deficient adhesion of vibration damping sheets to sheet steel. The coating emulsion used in the latter technique was insufficient to prevent vibration damping sheets from blocking.

Therefore, an object of the present invention is to provide a thermal adhesive vibration damping sheet which is resistant against blocking during shelf storage of a sheet stack, well adhesive to sheet steel by heat fusion, resistant against peeling from the underlying sheet steel at low temperatures, and efficient to manufacture.

SUMMARY OF THE INVENTION

According to the present invention, there is provided a thermal adhesive vibration damping sheet comprising a sheet substrate having crystalline polyolefin particles attached to a surface thereof, said polyolefin particles having a mean particle size of 1 to 20 μm and exhibiting an endothermic curve having a high temperature side endothermic peak in the range of from 50° to 230° C. as measured by a differential scanning calorimeter.

In one preferred embodiment, the sheet substrate is mainly comprised of a vinyl chloride polymer or copolymer, a vinyl chloride-vinyl acetate copolymer, an ethylene-vinyl acetate copolymer, an ethylene-ethyl acrylate copolymer or a mixture thereof. Alternatively, the sheet substrate is mainly comprised of an asphaltic material. Also preferably, the crystalline polyolefin is polyethylene, low molecular weight polyethylene, an ethylene-propylene copolymer, an ethylene-vinyl acetate copolymer or a mixture thereof.

DETAILED DESCRIPTION OF THE INVENTION

Figure 1:
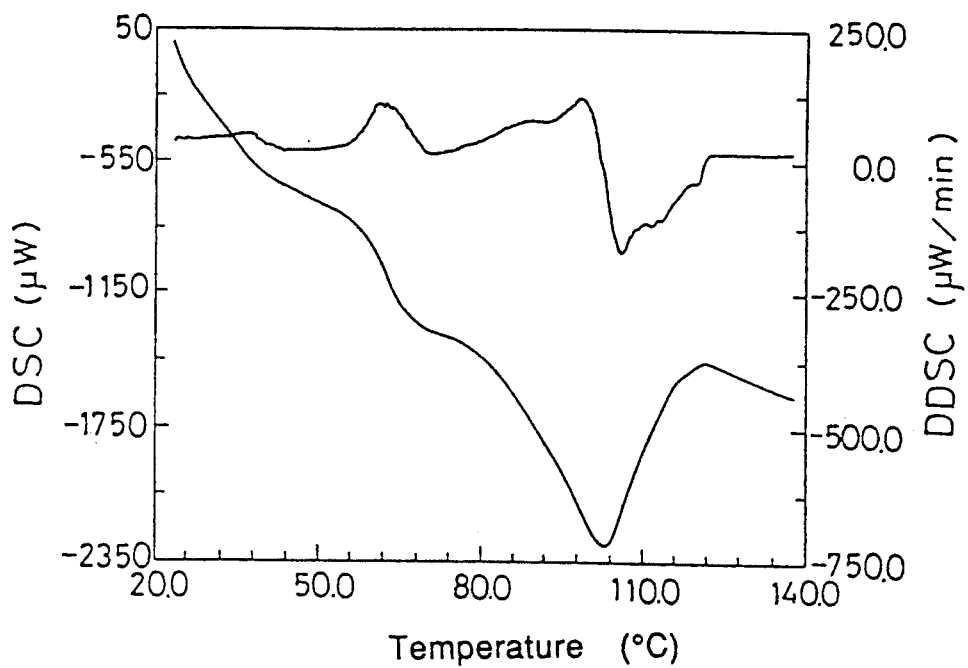
FIG. 1 is a diagram showing an endothermic curve of polyethylene (main component) in an aqueous dispersion used in Example 1 as measured by DSC.

According to the present invention, a thermal adhesive vibration damping sheet is prepared by applying an aqueous dispersion of a crystalline polyolefin to at least one major surface of a sheet substrate.

The sheet substrate is a sheet-shaped member having vibration damping function which is predominantly composed of a resin, for example, a vinyl chloride polymer or copolymer, an ethylene-vinyl acetate copolymer, a vinyl chloride-vinyl acetate copolymer, an ethylene-ethyl acrylate copolymer and a mixture thereof, or an asphaltic material. As the asphalt used in the present invention, there can be mentioned straight asphalt, blown asphalt (air-blown asphalt), a mixture comprising 50 to 80% by weight of blown asphalt (air-blown asphalt) and 50 to 20% by weight of straight asphalt, and asphalt for water protection works, such as oil-modified (oils and fats modified) blown asphalt (oil-modified air-blown asphalt), and oil-modified and blown asphalt (oil modified air-blown asphalt). These asphalts have a penetration value of 10 to 40 is preferably used, more preferably 10 to 30 is used. The penetration value can be measured by the the method described in JIS K 2207, ASTM D5-1986. Blown asphalt is especially preferred among these asphalts.

This oil-modified air-blown asphalt can be obtained incorporated an animal or vegetable oil such as a non-drying animal oil (for example, beef tallow), a drying animal oil (for example, cuttlefish oil), a semi-drying vegetable oil (for example, soybean oil) or a drying vegetable oil (for example, linseed oil), or a fatty acid pitch thereof (for example, rape oil) into air-blown asphalt, or by compounding an oil as mentioned above during the preparation of air-blown asphalt. It is generally preferred that the content of the animal or vegetable oil or the fatty acid pitch in the oil-modified asphalt be 1 to 20% by weight.

The base (resin or asphalt) may be blended with any desired additional components such as low molecular weight resin, plasticizer, rubber, inorganic filler and fibers by means of a Brabender, kneader, roll mill or extruder to mix and disperse the additives in the base, which is formed into sheet-shaped members by extrusion, rolling or the like.

The sheet substrate can be used in thickness of 1 to 5 mm, preferably 1.5 to 3 mm.

The low molecular weight resins used herein include natural and petroleum resins, for example, aromatic hydrocarbon resins, aliphatic hydrocarbon resins, alicyclic hydrocarbon resins, cumarone-indene resins, indene resins, dicyclopentadiene resins, polyterpene resins, solid polyamide resins, maleic modified rosin esters, isopropenyl toluene hydrocarbon resins, and hydrogenated hydrocarbon resins. The plasticizers used herein include petroleum plasticizers such as dibutyl phthalate, dioctyl phthalate, liquid polyethylene, polypropylene, process oil, vaseline, polybutadiene, and polybutene, vegetable oil plasticizers such as stearic acid and lauric acid, and other plasticizers. The rubbers used herein include natural rubber, polybutadiene, styrene-butadiene copolymer rubber, butyl rubber, neoprene rubber, chloroprene rubber, nitrile rubber, ethylene-propylene copolymer rubber, and ethylene-propylene-diene terpolymer rubber, and the like. The inorganic fillers which may be either granular or flake include mica, barium sulfate, calcium carbonate, talc, alumina flakes, and glass flakes. The fibers include rock wool, asbestos, pulp, finely broken wastepaper, synthetic pulp, and various synthetic fibers. These additional components including low molecular weight resin, plasticizer, rubber, inorganic filler and fibers may be used alone or in admixture of two or more.

The aqueous dispersions used in the thermal adhesive vibration damping sheets of the present invention are dispersions of crystalline polyolefin particles in water.

The crystalline polyolefins used herein include olefin homopolymers, copolymers of two or more olefins, and copolymers of an olefin base with a minor amount of vinyl monomer. The olefins include ethylene, propylene, 1-butene, 4-methyl-1-pentene, and the like. Exemplary of the vinyl monomers are styrene, vinyl acetate, methyl acrylate, methyl methacrylate, acrylonitrile, methacrylonitrile, vinyl chloride, vinylidene chloride, diethyl fumarate, and $\alpha,\beta$-unsaturated carboxylic acids and anhydrides thereof such as maleic anhydride. One or more such vinyl monomers are copolymerized with one or more olefins to form crystalline polyolefins.

The crystalline polyolefins may be used alone or in admixture of two or more.

Preferred among the crystalline polyolefins are high-, medium- and low-pressure processed polyethylenes, low molecular weight polyethylenes (having a viscosity-average molecular weight of 500 to 10,000 and including waxy material and thermal-degradation-polyethylene), ethylene-propylene copolymers, ethylene-1-butene copolymers, ethylene-4-methyl-1-pentene copolymers, ethylene-methacrylic acid copolymers, ethylene-methyl methacrylate copolymers and ethylene-vinyl acetate copolymers.

The crystalline polyolefin should exhibit an endothermic curve having a high temperature side endothermic peak in the range of from 50° to 230° C., preferably from 70° to 150° C. as measured by a differential scanning calorimeter (DSC). The DSC endothermic curve is generally measured by heating a sample at a predetermined rate, for example, 2° C./min. The endothermic curve contains a plurality of endothermic peaks, among which the peak appearing on the highest temperature side is herein designated high temperature side endothermic peak. The crystalline polyolefins that exhibit an endothermic curve having a high temperature side endothermic peak in the range of from 50° to 230° C. as measured by DSC do not melt at the normal storage temperature of vibration damping sheets and are effective in preventing vibration damping sheets from mutual blocking.

As to the molecular weight of the crystalline polyolefins, low molecular weight polyethylenes should preferably have a molecular weight of 500 to 10,000, and other polyolefins preferably have a melt flow rate of 1 to 500 g/10 min., more preferably 5 to 400 g/10 min., most preferably 10 to 200 g/10 min. as measured according to ASTM D-1238 at 190° C.

The crystalline polyolefins are of particulate form and should have a mean particle size of 1 to 20 μm, preferably 2 to 15 μm in order to prevent close contact between vibration damping sheets. In emulsion obtained by emulsion polymerization, polymer particles as used in the prior art are amorphous and have a smaller particle size so that they soften at relatively low temperatures to form a film prone to blocking. In contrast, the aqueous dispersion used in the present invention contains as a main ingredient a crystalline polyolefin having a relatively high melting point and a relatively large mean particle size, resulting in crystalline polyolefin particles adhering to the sheet substrate surface, thus prohibiting blocking.

The aqueous dispersion may contain the crystalline polyolefin in any desired concentration although 5 to 100 parts, preferably 10 to 70 parts by weight of crystalline polyolefin is present per 100 parts by weight of water.

Any desired method may be used in preparing the aqueous dispersion, for example, by placing a predetermined proportion of crystalline polyolefin particles and water in a mixing/dispersing means such as a colloidal mill and homomixer whereby the particles are mixed and dispersed in water, or by introducing a molten polyolefin into hot water with agitation for dispersion. If desired, surface-active agents, dispersing agent thickeners, defoaming agents, film forming aids and the like may be used.

One exemplary aqueous dispersion is an aqueous dispersion obtained by the method described in Japanese Patent Publication No. 42207/1983. This method involves the steps of melting a polyolefin composition composed of (a) 50 to 99 parts by weight of a polyolefin having an intrinsic viscosity [η] of up to 5, preferably 0.1 to 5 and (b) 1 to 50 parts by weight of a carboxyl-containing polyolefin having an intrinsic viscosity [η] of 0.04 to 1, preferably 0.06 to 0.8, and an acid value of 30 to 150, preferably 50 to 130, and mixing and agitating the molten polyolefin composition in water containing (c) a basic substance in an amount of at least 0.2 chemical equivalents relative to the carboxyl group in said polyolefin composition (acid anhydride group being calculated as having 2 carboxyl groups) at a temperature between 140° C. and 300° C. and above the highest temperature among DSC peak temperature of said polyolefin composition, thereby forming an aqueous dispersion of spherical particles having a size within the above-defined range.

The polyolefin having an intrinsic viscosity [η] of up to 5 (a) may be selected from waxes and resins composed of any of the above-defined crystalline polyolefins. The carboxyl-containing polyolefin (b) may be selected from polyolefins having a carboxyl and/or acid anhydride group, for example, copolymer or graft copolymer comprising olefin unit and a monomer unit of an $\alpha,\beta$-unsaturated carboxylic acid such as maleic acid, fumaric acid, and itaconic acid or an anhydride thereof. The intrinsic viscosity [$\eta$] is defined as a measurement in decalin at 135° C.

The basic substance (c) is selected from those substances that act as a base in water, for example, (i) alkali metals, alkaline earth metals, ammonia and amines, (ii) oxides, hydroxides, weak acid salts, and hydrides of alkali metals, (iii) oxides, hydroxides, weak acid salts, and hydrides of alkaline earth metals, (iv) alkoxides of these metals, and (v) mixtures thereof.

According to this method, a pressure vessel equipped with an agitating blade is first charged with predetermined amounts of basic substance (c) and water. The system is adjusted to a temperature above the highest one of the melting points of polyolefins (a) and (b), preferably above the temperature at which the polyolefin composition has a melt viscosity of up to $10^5$ centipoise. Next, the polyolefin composition is heat melted and thoroughly mixed in a separate vessel equipped with mixing means whereupon the composition is gradually fed to the water. Alternatively, as the polyolefin composition is melted and mixed in an extruder, it is gradually fed to the water. After a predetermined amount of polyolefin composition has been fed, agitation is usually continued for 30 minutes or more. Upon cooling down to room temperature, there is obtained an aqueous dispersion.

Then the aqueous dispersion at the as-obtained concentration or after dilution to a desired concentration is applied to a sheet substrate and dried, yielding a thermal adhesive vibration damping sheet according to the present invention.

The aqueous dispersion can be applied to sheet substrates by any well-known techniques, for example, spray coating, brush coating, dipping, flow coating, and roll coating. The coating amount of the aqueous dispersion generally ranges from about 0.05 to about 0.35 g/100 cm$^2$, preferably about 0.10 to about 0.30 g/100 cm$^2$ calculated on a solid basis.

After application, the coating is dried at a temperature of from room temperature to about 40° C., yielding a thermal adhesive vibration damping sheet having a crystalline polyolefin layer with excellent anti-blocking property.

The thermal adhesive vibration damping sheets of the present invention are often attached to sheet steel through heat fusion so that the vibration of the sheet steel may be effectively suppressed. The sheets may be utilized for damping vibration in vibration sources as found in buildings, vehicles, ships, and the like.

EXAMPLE

Examples of the present invention are given below along with Comparative Examples by way of illustration and not by way of limitation. The coverage or coating weight is calculated on a solid basis.

In the Examples, blocking, impact resistance and thermal adhesion property were examined by the following tests.

Blocking

There were prepared two vibration damping sheet samples (100 mm×100 mm×2.5 mm) having an aqueous dispersion coated on one surface. The sheets were stacked one on top of the other such that the dispersion coated surface of one sheet faced the dispersion-free surface of the other sheet. The stack was held stationary under a load of 1500 grams at 40° C. for 24 hours. Thereafter an attempt was made to separate the sheets of the stack to examine whether blocking occurred between the overlapping surfaces. The degree of blocking was shown by the following classes.

Figure 11A:
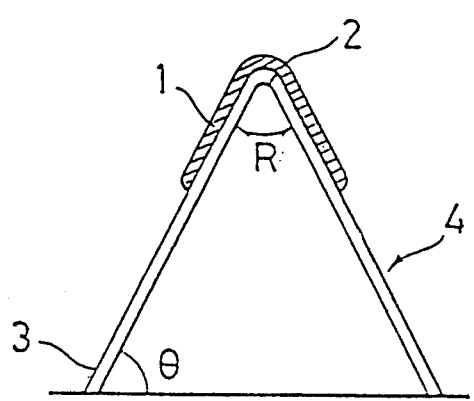
FIGS. 11A and 11B are front and side views of an angle used in a heat fusion test.
Figure 11B:
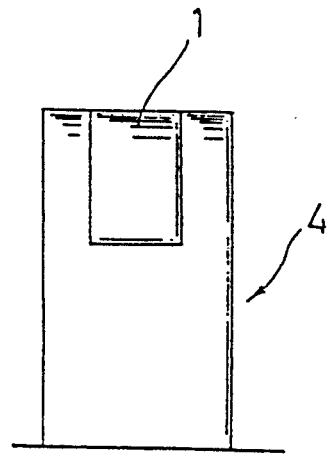

3: readily separable
2: thermo-adhesion along the edges, but completely separable
1: separable with some thermo-adhesion portions
0: inseparable As shown in FIGS. 11A and 11B, a vibration damping sheet piece 1 (200 mm×50 mm×2.5 mm) was closely laid on an angled steel plate 4 (0.8 mm thick) having a bend 2 with a radius of curvature R and legs 3 forming an angle $\theta$ relative to the horizontal plane. Table 1 shows six sets of radius of curvature R (5 and 2 mm) and leg inclination angle $\theta$ (80°, 85°, and 90°). The assembly was heated at 150±3° C. for 30 minutes and allowed to cool down to room temperature. The vibration damping sheet piece was examined whether it cut (or run away) and sagged.

Low-temperature impact resistance

A vibration damping sheet piece (300 mm×300 mm×2 mm) was rested on a steel plate of 400 mm×400 mm×0.8 mm at the center, which was heated at 150±3° C. for 30 minutes and allowed to cool down to room temperature. The resulting test specimen was placed in a constant temperature tank where it was maintained at 5±1° C. for 30 minutes. Immediately thereafter, the specimen was attached to an impact test machine with the vibration damping sheet piece faced down. A steel ball of 150 grams was repeatedly dropped on the test specimen from a height of 1 m. The test specimen was examined whether cracking or stripping.

EXAMPLE 1

An aqueous dispersion (40 grams polyethylene/60 grams water) was prepared by dispersing in water polyethylene particles having a mean particle size of 4 $\mu$m and exhibiting an endothermic curve having a high temperature side endothermic peak near 110° C. as measured by DSC as shown in FIG. 1.

Substrate sheets (100 mm×100 mm×2.5 mm) were prepared from a composition based on blown asphalt penetration value 10 to 20 having a petroleum resin and mica blended therein. The aqueous dispersion was applied to the asphalt sheets in varying coverage and dried. There were obtained vibration damping sheet samples having the aqueous dispersion coated in varying weights. The samples were examined for blocking, with the results shown in FIG. 2.

COMPARATIVE EXAMPLE 2

Figure 3:
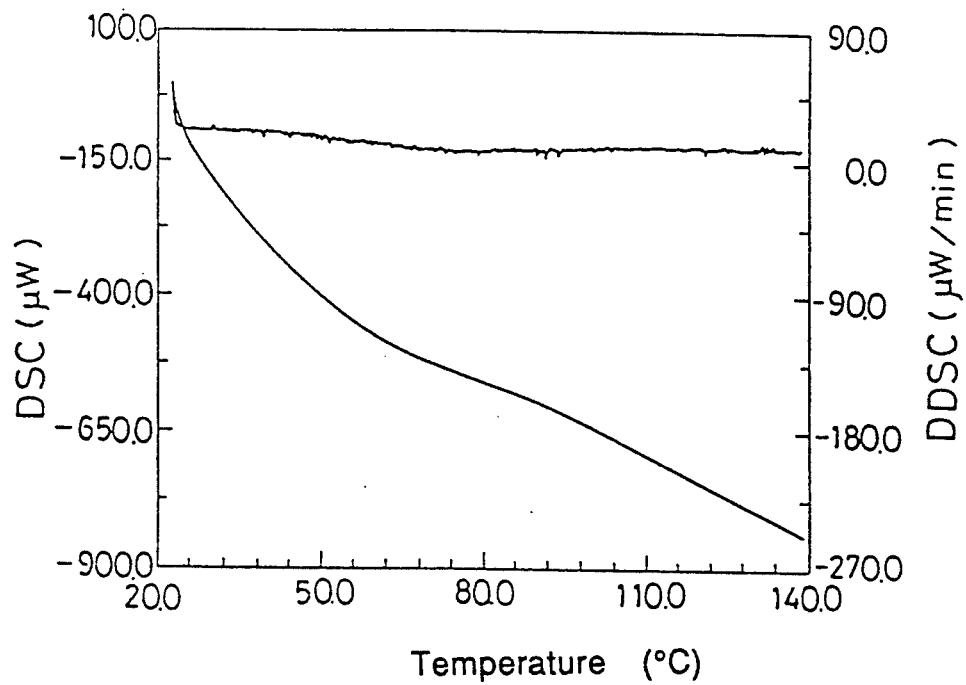
FIGS. 3 to 9 are diagrams showing an endothermic curve of a main component of each aqueous dispersion or emulsion used in Examples and Comparative Examples as measured by DSC.
Figure 2:
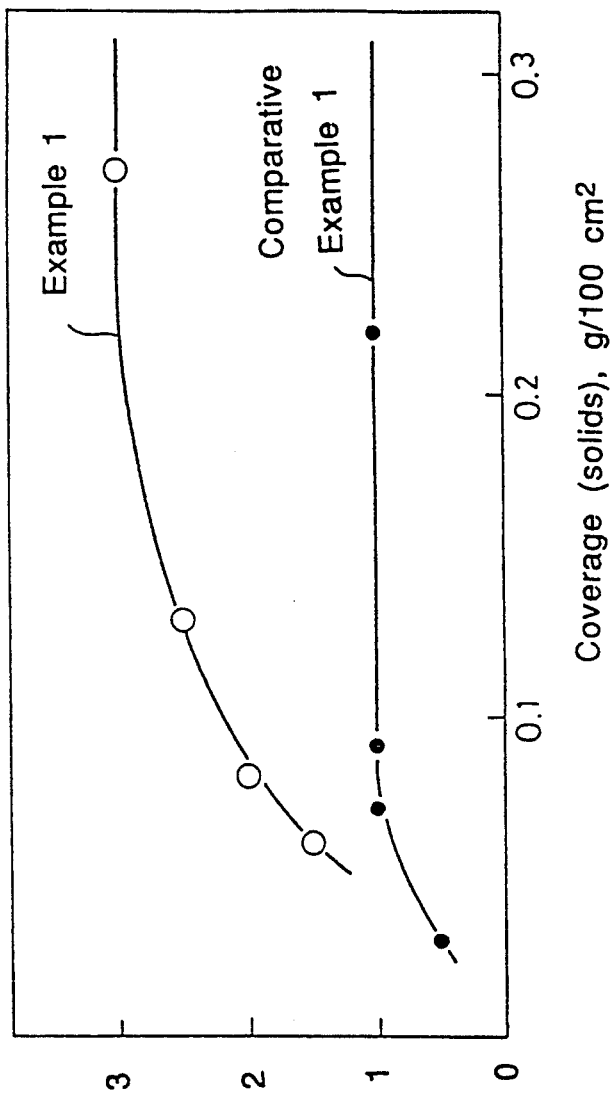
FIG. 2 is a diagram showing the blocking property of Example 1 and Comparative Example 1.

Using an emulsion (major component: vinyl acetate) of a vinyl acetate-ethylene copolymer prepared by emulsion polymerization so as to have a mean particle size of 1-2 $\mu$m and exhibit an endothermic curve having no endothermic peak as measured by DSC as shown in FIG. 3, a vibration damping sheet sample was fabricated and examined for blocking as in Example 1. The results are shown in FIG. 2 together with the results of Example 1.

EXAMPLES 2-6 AND COMPARATIVE EXAMPLE 2-9

Examples 2-6 used aqueous dispersions A, B, C, D, and E of crystalline polyolefins having a mean particle size and a DSC endothermic curve as identified below.

Comparative Example 2 used an aqueous dispersion F and Comparative Examples 3-9 used emulsions a, b, c, d, e, f and g as identified below.

Figure 4:
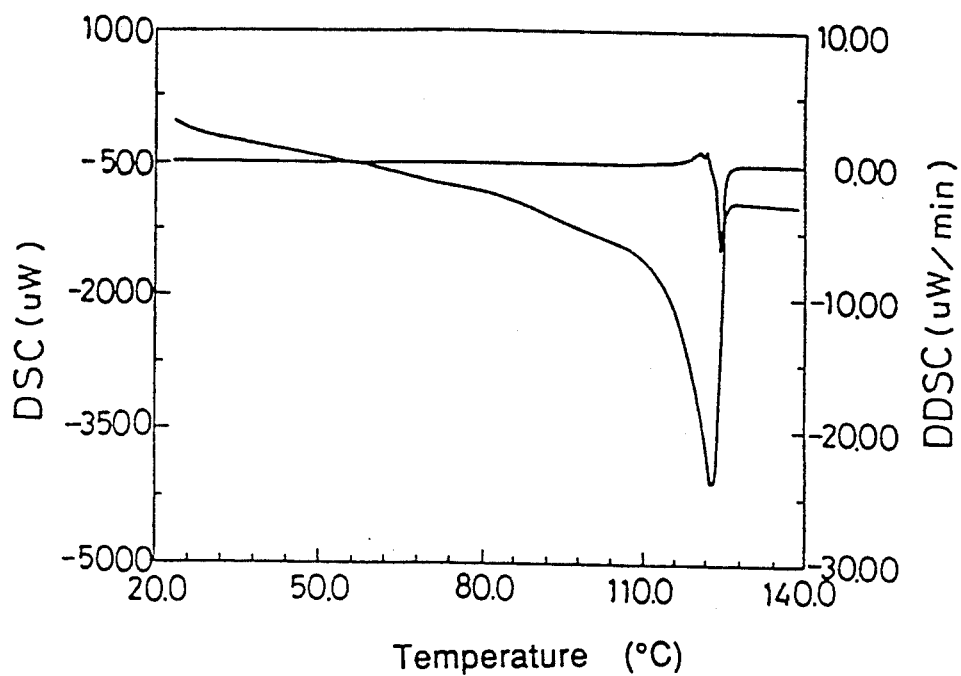
Figure 5:
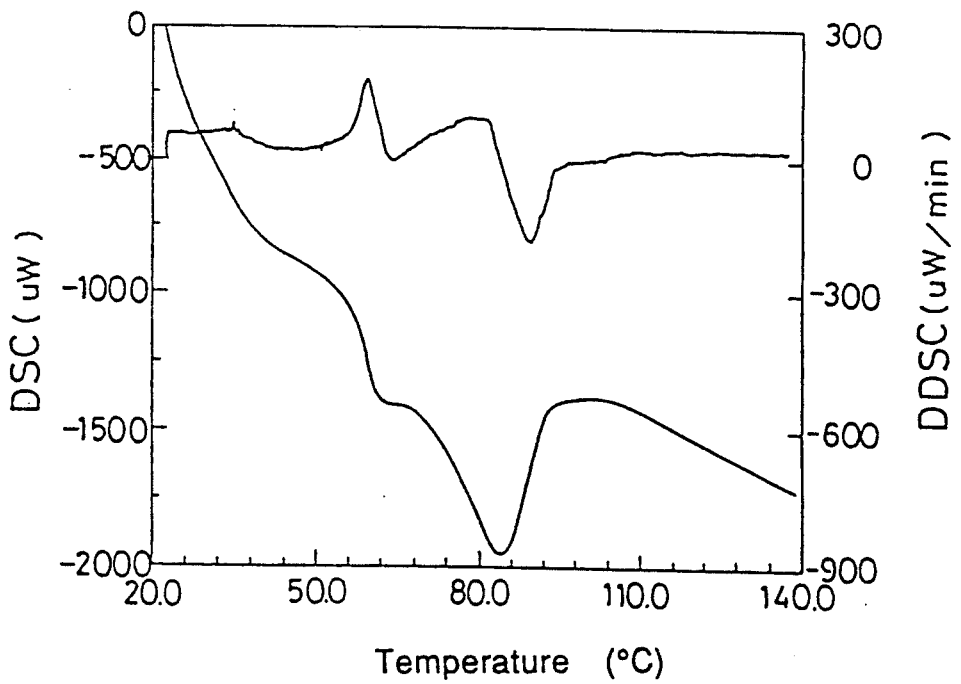
Figure 6:
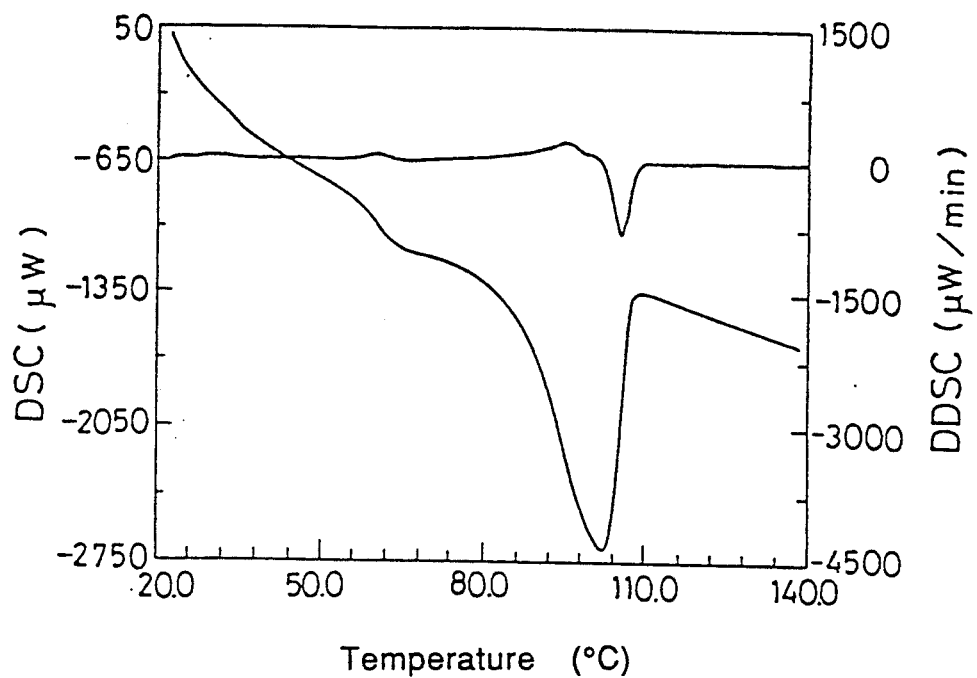
Figure 7:
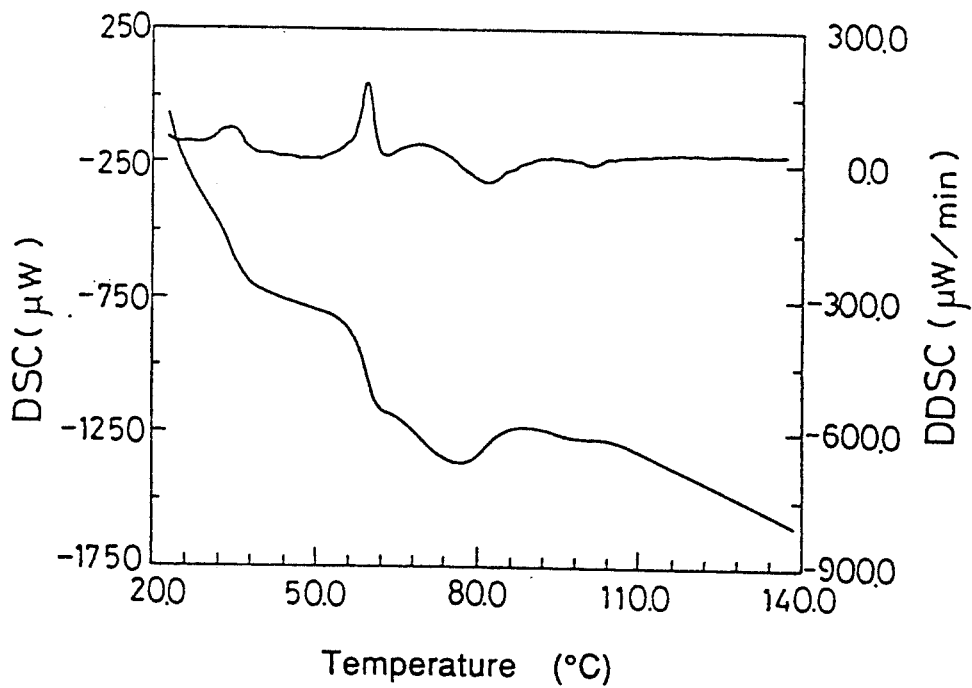
Figure 8:
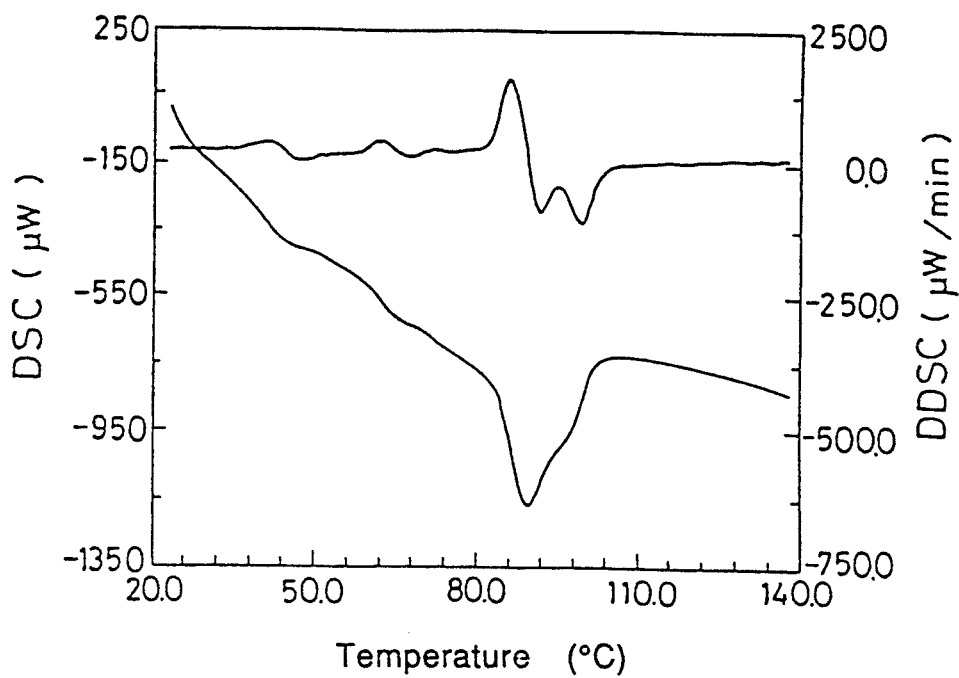
Figure 9:
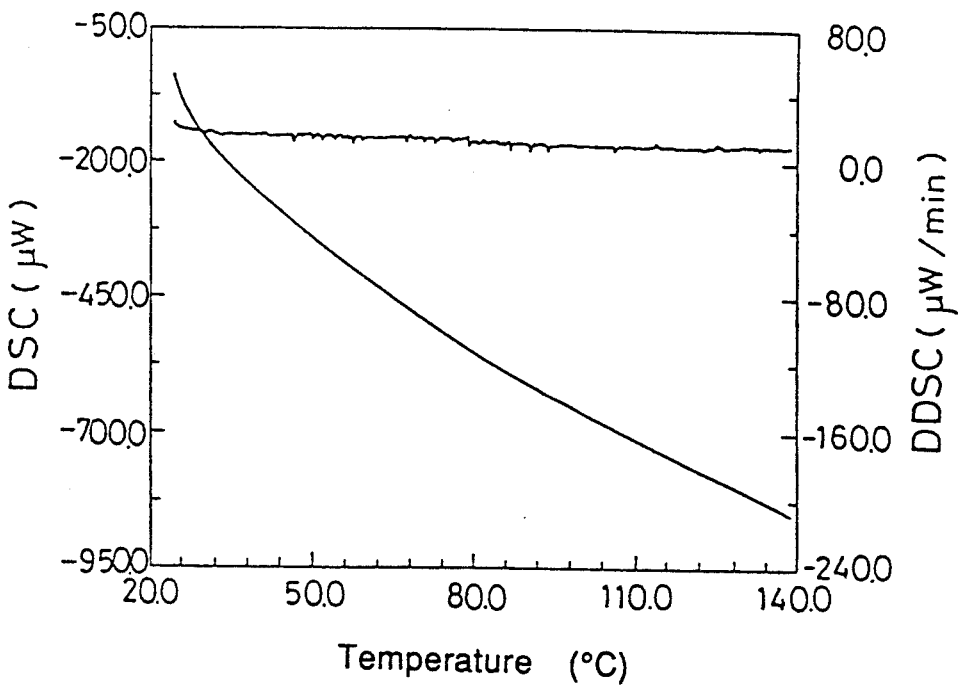

|  | Mean particle size | Endo- thermic curve |
|---|---|---|
| Aqueous dispersions | | |
| A: low molecular weight polyethylene | 4 μm | FIG. 1 |
| B: low molecular weight polyethylene | 3 μm | FIG. 4 |
| C: ethylene-propylene copolymer | 4 μm | FIG. 5 |
| D: low density polyethylene | 6 μm | FIG. 6 |
| E: ethylene-vinyl acetate copolymer | 6 μm | FIG. 7 |
| F: ethylene-methacrylic acid copolymer (ionomer resin) | <1 μm | FIG. 8 |
| Emulsions | | |
| a: vinyl acetate-ethylene copolymer | 1-3 μm | FIG. 3 |
| b: styrene-butadiene rubber latex | | FIG. 9 |
| c: acrylic acid-styrene copolymer | | |
| d: acrylic polymer | | |
| e: vinyl acetate polymer | | |
| f: polyester | | |
| g: polyurethane | | |

Note that Emulsions c, d, e, f, and g exhibited DSC endothermic curves having no endothermic peak as in FIGS. 3 and 9.

Figure 10:
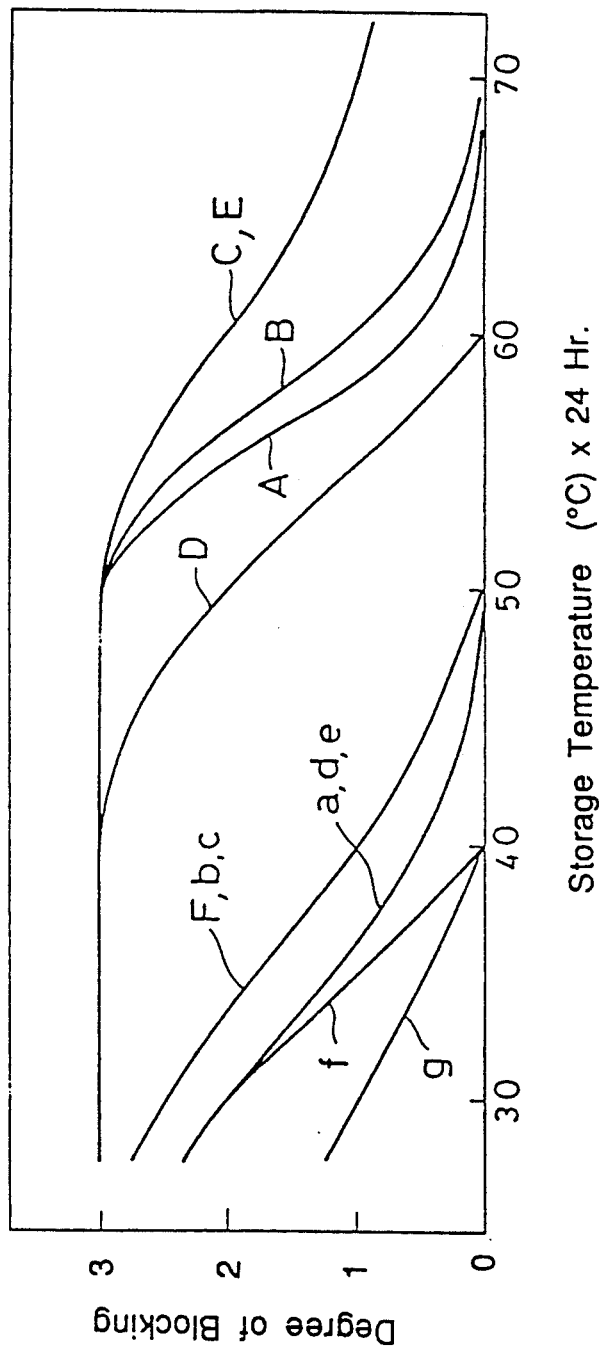
FIG. 10 is a diagram showing the blocking property of Examples 2-6 and Comparative Examples 2-9.

Using these dispersions or emulsions, vibration damping sheet samples were prepared as in Example 1, each sheet was coated in varying coverage of 0.15 to 0.25 g/100 cm² on a solid base, stored at varying temperatures for 24 hours, and thereafter examined for blocking. The results are shown in FIG. 10.

EXAMPLES 7-9

Vibration damping sheet samples (200 mm×50 mm×2.5 mm) were prepared as in Example 1 by applying the same aqueous dispersion as prepared in Example 1 to the same asphalt sheets as used in Example 1, but to different coverages of 0.1 g/100 cm² (Example 7), 0.15 g/100 cm² (Example 8), and 0.3 g/100 cm² (Example 9) calculated on a solid basis.

The vibration damping sheet samples were examined for thermal adhesive property, with the results shown in Table 1.

COMPARATIVE EXAMPLE 10

A vibration damping sheet sample was prepared as in Example 7 except that talc was adhered instead of the aqueous dispersion. The results of its thermal adhesive property test are shown in Table 1.

COMPARATIVE EXAMPLE 11

The sample was a control. The same asphalt sheet as used in Example 1 without any aqueous dispersion or talc was examined for thermal adhesive property, with the results shown in Table 1.

TABLE 1

| | Coverage (g/100 cm²) | R-θ combination | | | | | |
| | | R = 5 mm | | | R = 2 mm | | |
| | | 80° | 85° | 90° | 80° | 85° | 90° |
|---|---|---|---|---|---|---|---|
| CE10 | 0.15 | 6/6 | 6/6 | 0/6 | 6/6 | 4/6 | 0/6 |
| CE11 | 0 | 6/6 | 6/6 | 0/8 | 6/6 | 6/6 | 1/8 |
| E7 | 0.1 | 6/6 | 6/6 | 3/8 | 6/6 | 6/6 | 4/8 |
| E8 | 0.15 | 6/6 | 6/6 | 6/8 | 6/6 | 6/6 | 5/8 |
| E9 | 0.3 | 6/6 | 6/6 | 6/8 | 6/6 | 6/6 | 8/8 |

In Table 1, 6/6 means the best result that six samples among the six samples were acceptable because none of the samples showed runaway or sagging, 0/6 means the worst result that none of the six samples were acceptable, and so forth.

EXAMPLES 10-11

Vibration damping sheet samples (300 mm×300 mm×2 mm) were prepared as in Example 1 by applying the same aqueous dispersion as prepared in Example 1 to the same asphalt sheets as used in Example 1, but to different coverages of 0.1 g/100 cm² (Example 10) and 0.3 g/100 cm² (Example 11).

The vibration damping sheet samples were examined for low-temperature impact resistance, with the results shown in Table 2.

COMPARATIVE EXAMPLE 12

The sample was a control. The same asphalt sheet as used in Example 1 without any aqueous dispersion was examined for low-temperature impact resistance, with the results shown in Table 2.

TABLE 2

| | Coverage (g/100 cm²) | Impact test result (each three samples) |
|---|---|---|
| CE12 | 0 | stripped at 1st to 2nd cycle |
| E10 | 0.1 | stripped at 3rd to 7th cycle |
| E11 | 0.3 | not stripped over 100 cycles |

There have been described thermal adhesive vibration damping sheets which are resistant against blocking to adjacent sheets during shelf storage of stacked sheets, well adhesive to sheet steel by heat fusion, resistant against peeling from the underlying sheet steel at low temperatures, and efficient to manufacture. The sheets may be utilized in a wide variety of applications where vibration damping is required as found in buildings, vehicles, ships, and the like.

Although some preferred embodiments have been described, many modifications and variations may be made thereto in the light of the above teachings. It is therefore to be understood that within the scope of the appended claims, the invention may be practiced otherwise than as specifically described.

We claim:

1. A vibration damping sheet which exhibits tackiness upon heating comprising:
   (A) a sheet substrate comprising an asphaltic material and having a thickness in the range of 1 to 5 mm; and
   (B) crystalline polyolefin particles on a surface of said sheet substrate (A) having a mean particle size of 1 to 20 μm and exhibiting an endothermic curved having at least one endothermic peak, the highest endothermic peak appearing at a temperature in the range of from 50° to 230° C. as measured by a differential scanning calorimeter, said polyolefin particles being present in an amount of from 0.05 to 0.35 grams per 100 square centimeters.

2. The vibration damping sheet of claim 1 wherein said crystalline polyolefin particles comprise at least one member selected from the group consisting of polyethylene, an ethylene-propylene copolymer, and an ethylene-vinyl acetate copolymer.

3. The vibration damping sheet of claim 2, wherein said crystalline polyolefin particles comprise low molecular weight polyethylene having a molecular weight in the range of from 500 to 10,000 as measured by viscosity average molecular weight.

4. The vibration sheet of claim 1, wherein said highest endothermic peak appears in a temperature range of 70° to 150° C.

5. The vibration damping sheet of claim 1 wherein said vibration damping sheet is prepared by
   applying an aqueous dispersion of the crystalline polyolefin particles on a surface of said substrate, and
   drying the aqueous dispersion applied on the substrate to produce the vibration damping sheet.

* * * * *